Oct. 6, 1959   A. T. BERMINGHAM, JR., ET AL   2,907,514
RETURN ENVELOPE MAILING PIECE
Filed Oct. 27, 1955   7 Sheets-Sheet 4
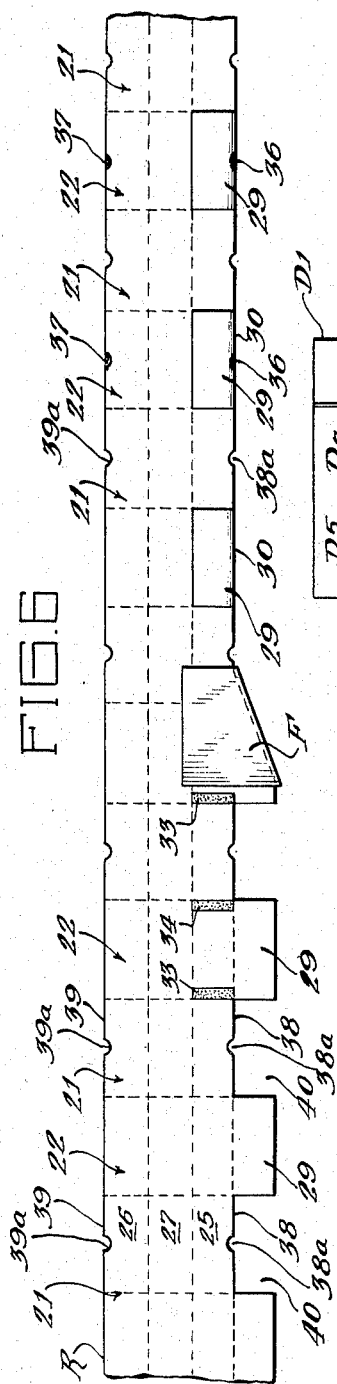
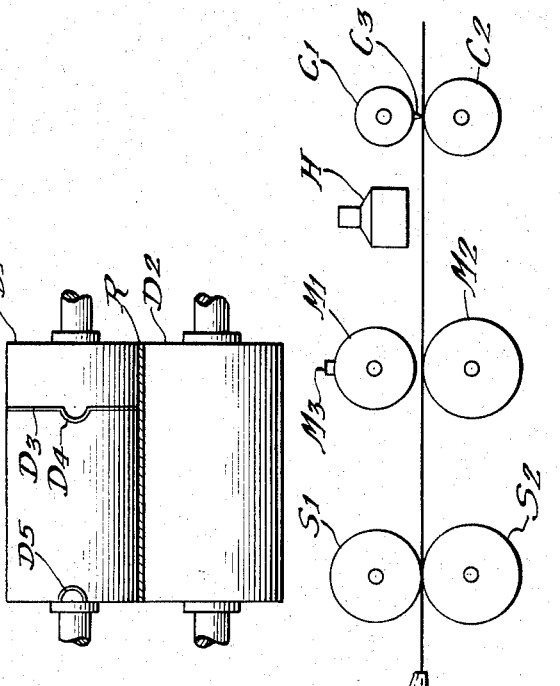
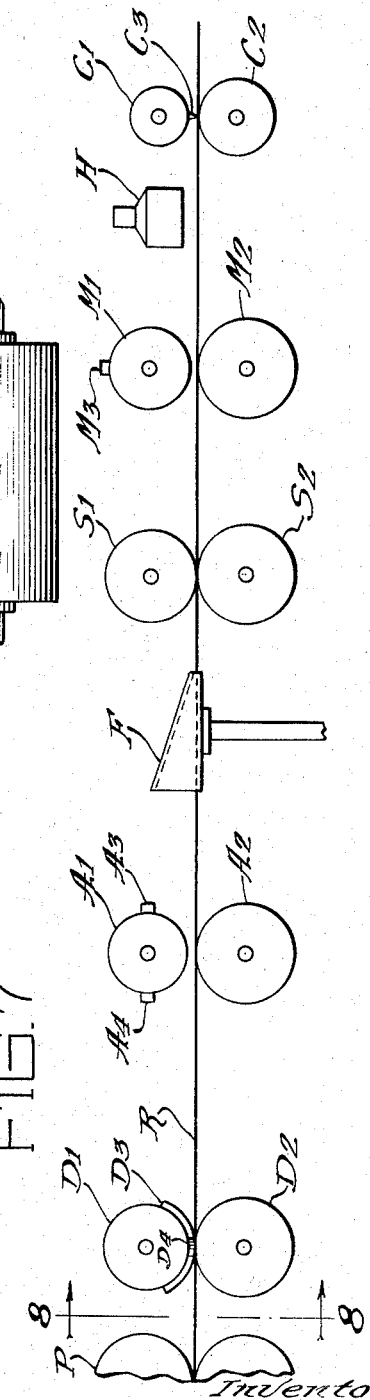
Inventors:
Arthur T. Bermingham, Jr.
Glenn P. Holthaus
By: Schroeder, Hofgren,
Brady & Wegner
Attorneys

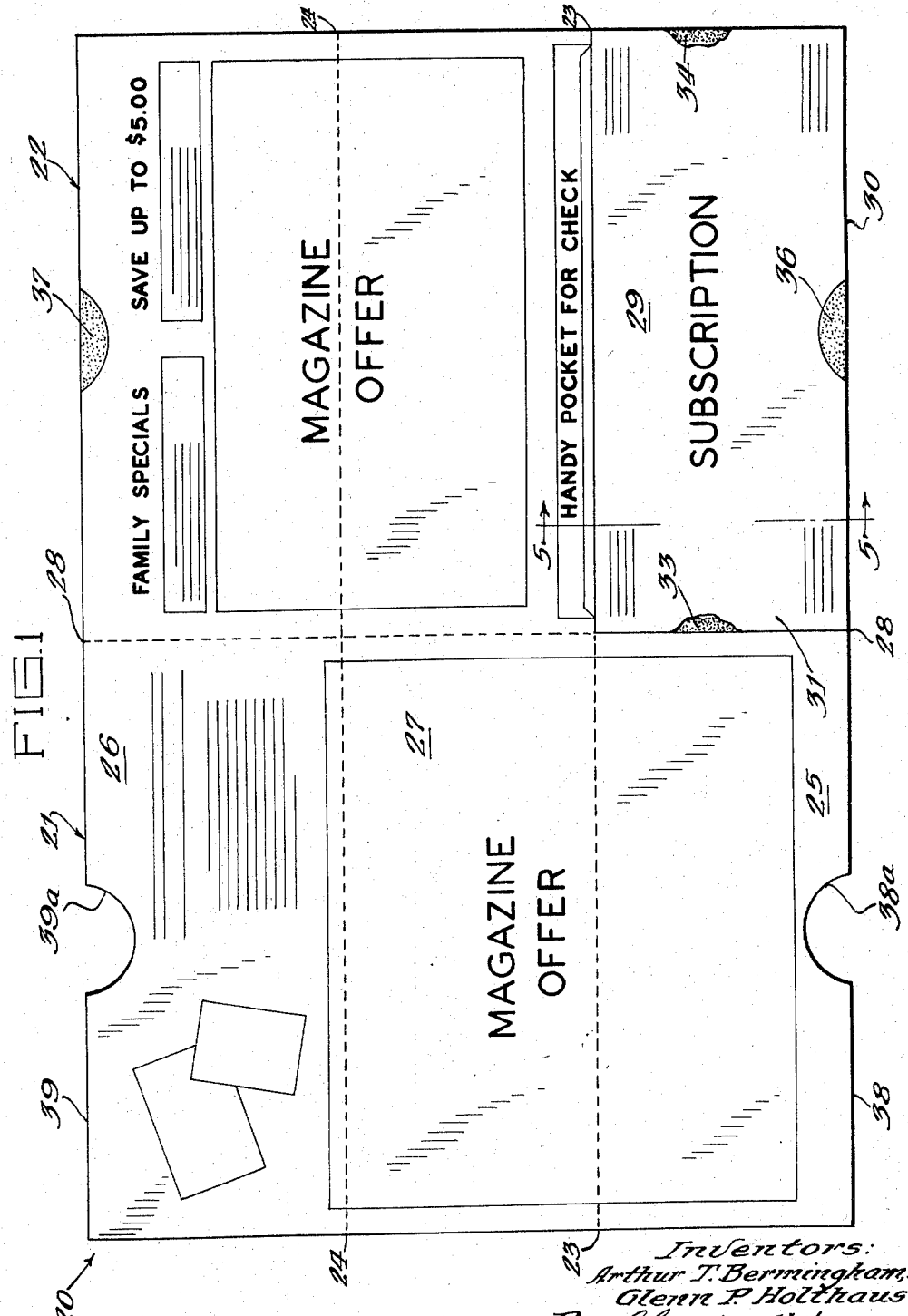

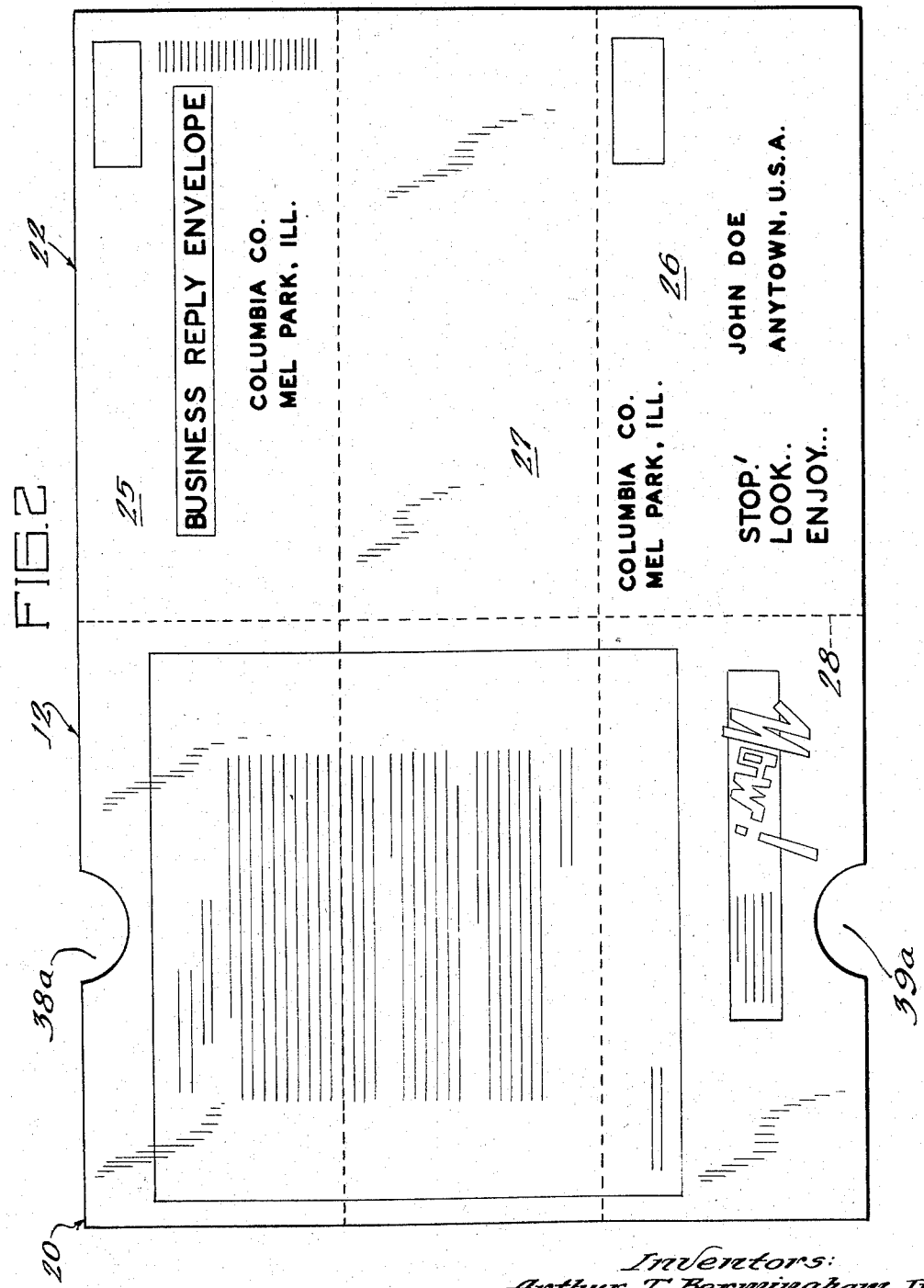

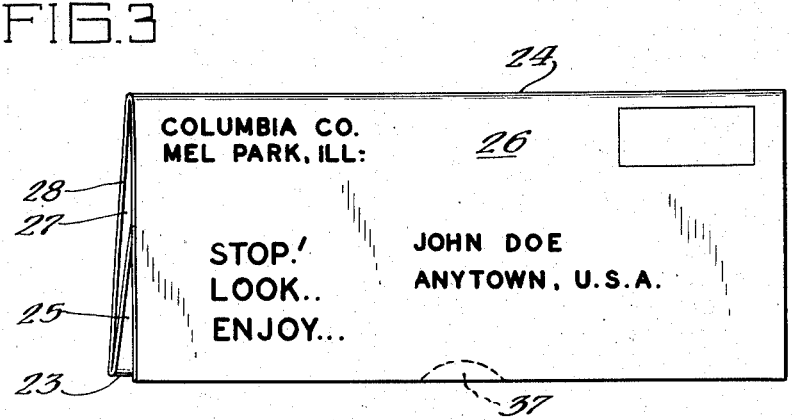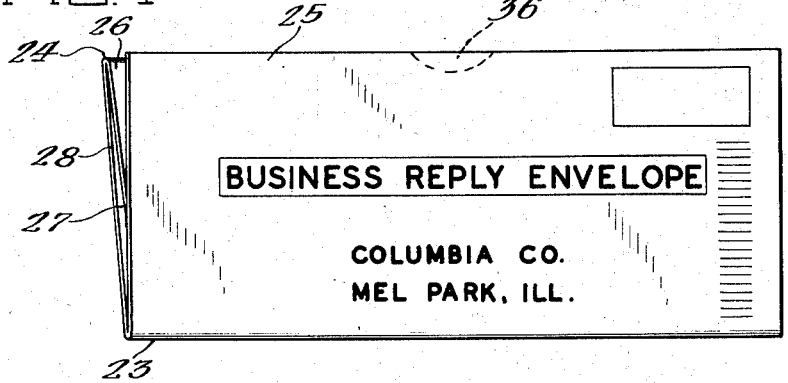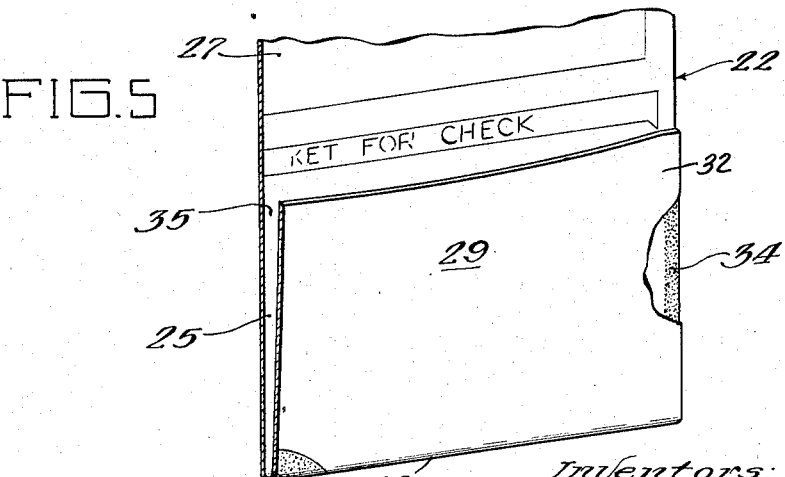

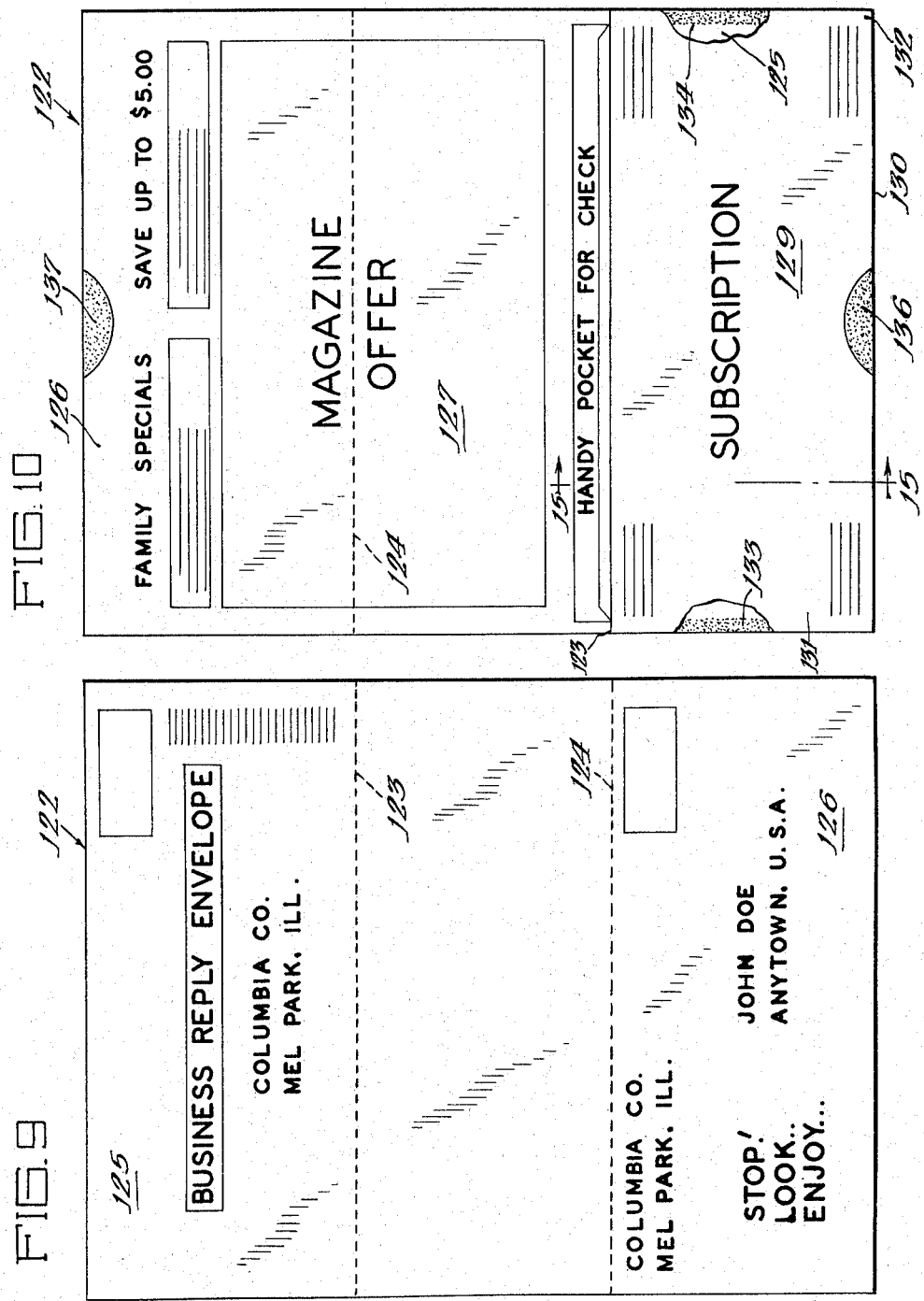

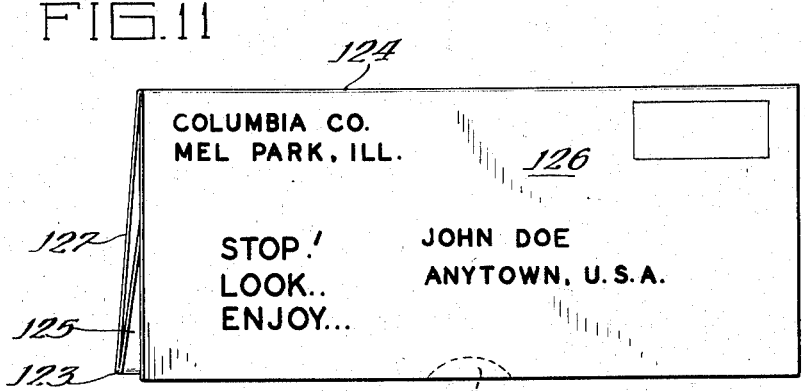
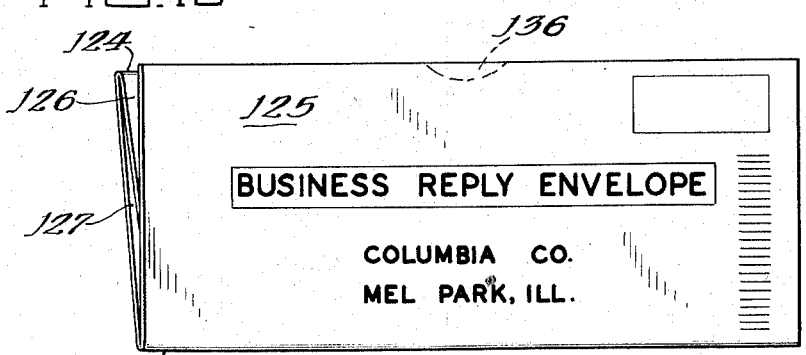
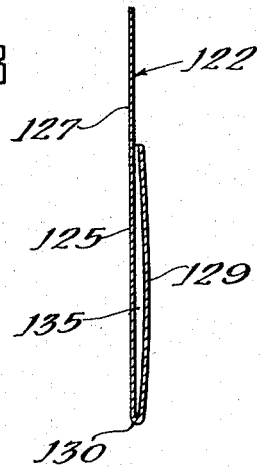

Oct. 6, 1959  A. T. BERMINGHAM, JR., ET AL  2,907,514
RETURN ENVELOPE MAILING PIECE
Filed Oct. 27, 1955  7 Sheets-Sheet 7
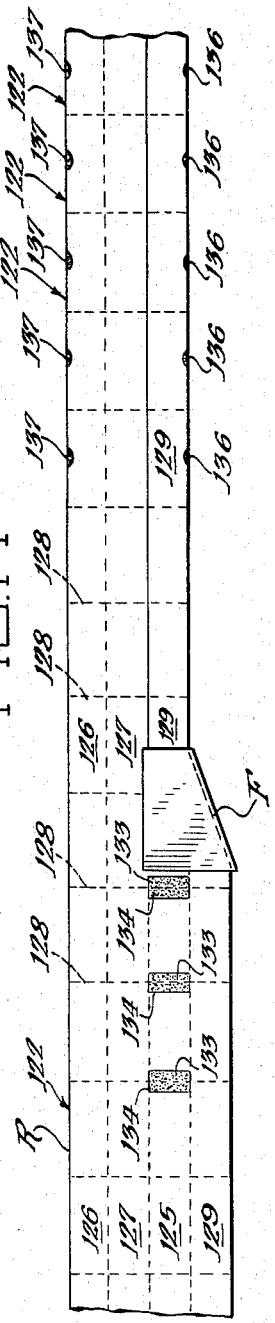
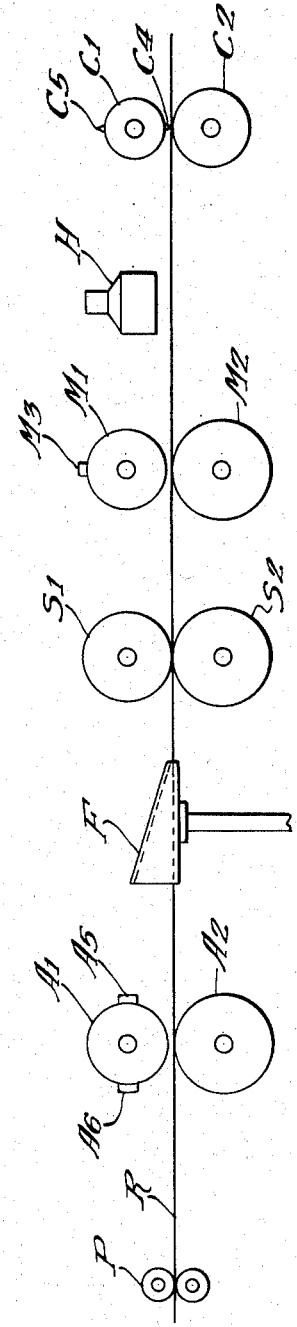
Inventors:
Arthur T. Bermingham, Jr.
Glenn P. Holthaus
By: Schroeder, Hofgren,
Brady & Wegner
Attorneys

United States Patent Office 2,907,514
Patented Oct. 6, 1959

2,907,514

RETURN ENVELOPE MAILING PIECE

Arthur T. Bermingham, Jr., River Forest, Ill., and Glenn P. Holthaus, Omaha, Nebr., assignors to Columbia Envelope Company Application October 27, 1955, Serial No. 543,135

7 Claims. (Cl. 229—73)

This invention relates to a return envelope mailing piece, and in particular it relates to such a mailing piece which is suitable for manufacture in a continuous operation from a ribbon of paper stock, and the method of producing such mailing pieces.

The principal object of the invention is to provide a return envelope mailing piece in which the various components of the mailing piece are so shaped and secured together that the mailing pieces may be readily produced in a continuous operation on a paper web or ribbon.

A further object of the invention is to provide a continuous method of manufacturing return envelope mailing pieces from a continuous paper web or ribbon, starting with a printing operation in which the webs are printed in a rotary perfecting press.

A further object of the invention is to provide a mailing piece with an integral return envelope pocket which may be mailed to an addressee and returned to the sender with a remittance or order in the pocket without the need for detaching any part of the mailing piece.

Yet another object of the invention is to provide a return envelope mailing piece in which the structural principles and the manufacturing principles are equally applicable to a two-sheet mailing piece or a one-sheet mailing piece.

The invention is illustrated in the accompanying drawings, in which:

Fig. 1 is a plan view of the inner face of a two-sheet mailing piece constructed in accordance with the invention with parts broken away;

Fig. 2 is a plan view of the outer face of the mailing piece of Fig. 1;

Fig. 3 is an elevational view of the mailing piece of Fig. 1 folded for original mailing;

Fig. 4 is a view similar to Fig. 3 showing the device folded for return mailing;

Fig. 5 is a fragmentary section taken along the line 5—5 of Fig. 1 with parts broken away to show the construction;

Fig. 6 is a schematic plan view showing the successive steps in the production of a two-sheet mailing piece in accordance with the present invention;

Fig. 7 is a schematic elevational view of apparatus for performing the method;

Fig. 8 is a section on an enlarged scale taken as indicated along the line 8—8 of Fig. 7;

Fig. 9 is a plan view of the outer face of a single sheet mailing piece constructed in accordance with the invention;

Fig. 10 is a view similar to Fig. 9 showing the inner face of the mailing piece;

Fig. 11 is an elevational view of a single sheet mailing piece folded for initial mailing;

Fig. 12 is a view similar to Fig. 11 showing the device of Fig. 11 folded for return mailing;

Fig. 13 is a section taken as indicated along the line 13—13 of Fig. 10;

Fig. 14 is a schematic plan view showing the steps of producing a single sheet mailing piece in accordance with the invention; and Fig. 15 is a schematic side elevational view of suitable apparatus for making single sheet mailing pieces in accordance with the invention.

Referring to the drawings in greater detail, and referring first to Figs. 1 to 5, a two-sheet mailing piece, indicated generally at 20, in accordance with the present invention includes an advertising area indicated generally at 21 and a return envelope body sheet area indicated generally at 22; and both said areas are divided by laterally extending fold lines 23 and 24 into three rectangular portions of equal height, there being a first marginal portion 25, a second marginal portion 26 and a central portion 27. The mailing piece may be folded along a central vertical line 28 to superimpose the advertising area 21 upon the return envelope area 22, and the mailing piece may then be folded along the lines 23 and 24 to reduce it to the form shown in Figs. 3 and 4 for mailing. Each of the portions 25, 26 and 27 is uninterrupted between its boundaries by any lines of weakening, apertures, or the like; so that there are no restrictions on the arrangement of printed matter in said portions.

As best seen in Figs. 1 and 5, a pocket sheet 29 is integrally connected to the marginal portion 25 of the return envelope body sheet area 22 along a fold line 30 and has its end marginal portions 31 and 32 connected to the marginal portion 25 by lines of adhesive 33 and 34. Thus, the return envelope area 22 is originally divided into four equal rectangular quarters 25, 26, 27 and 29; and the portion 29 is folded in upon the quarter 25 so that the quarter 29 serves as the pocket sheet and forms the inner wall of an envelope pocket 35 (see Fig. 5) while the marginal portion 25 forms the outer wall of said envelope pocket 35.

Adjacent the fold line 30 on the pocket sheet 29 is a semicircular area of moisture-sensitive adhesive 36, and on the inner face of the marginal portion 26 is a similar area of moisture-sensitive adhesive 37. As seen in Fig. 2, the portion 25 of the return envelope area 22 affords a space for a return address while the portion 26 provides a space for an original mailing address for sending the mailing piece to a prospective customer. The laterally extending margins 38 and 39 of the advertising area 21 are provided with jogs, or recesses 38a and 39a respectively so that when the mailing piece is folded with the advertising area 21 superposed upon the inside of the return envelope area 22 the jogs 38a and 39a leave the adhesive areas 36 and 37 exposed. Thus, as seen in Figs. 3 and 4, for original mailing the mailing piece may be folded first along the line 23 to place the pocket sheet 29 in facing relationship with the center portion 27, after which the marginal portion 26 may be folded over the outside of the envelope pocket as seen in Fig. 3 and the mailing piece sealed by moistening the adhesive area 37 and adhering it to the adjacent portion of the outer face of the marginal portion 25.

When the mailing piece reaches its destination and is opened and read if the addressee wishes to respond to the offer contained in the mailing piece he need only insert his check in the envelope pocket 35, fold the marginal portion 26 in against the central portion 27 and then fold the marginal portion 25 over the outside so as to conceal the original mailing address and make the return mailing address visible as seen in Fig. 4. The adhesive area 36 may then be moistened and the unit sealed by adhering it to the adjacent area of the portion 26 alongside the fold on the line 24.

One of the principal features of the present invention is that mailing pieces may be manufactured continuously from an advancing ribbon or web of paper stock as shown schematically in Figs. 6 to 8. In accordance with the method a ribbon R is advanced continuously through a rotary perfecting press P which prints any desired material on both sides of the ribbon. From the press the ribbon passes to a pair of die cutting rollers D1 and D2 in which the roller D1 has a circumferentially extending cutting element D3 provided with an arcuate jog D4 and also has in longitudinal alignment with the jog D4 a second jog D5. As the ribbon R passes between the die cutting rollers D1 and D2 a piece is cut out of the ribbon at regular intervals to form rectangular spaces 40 as well as forming the arcuate jogs 38a and 39a in the ribbon. At this point the ribbon has defined advertising areas 21 which are ¾ of the original ribbon width alternating with return envelope areas 22 which are full ribbon width. The same portions of the mailing piece which have been previously described are definable in the ribbon, there being flanking portions 25 and 26 and a central portion 27, and the projecting quarters of the return envelope areas 22 providing the pocket sheets 29.

From the die cutting rolls D1 and D2 the ribbon passes between a pair of adhesive applying rolls A1 and A2, the upper roll A1 having laterally extending adhesive applying ribs A3 and A4 for applying to the ribbon the spaced adhesive strips 33 and 34.

From the adhesive applying rolls A1 and A2 the ribbon passes adjacent a folder F which turns in the extending marginal quarters forming the pocket sheets 29 so as to make the folded margins 30 and superimpose each pocket sheet 29 on the next adjacent portion 25 of the ribbon so that when the ribbon passes between sealing rolls S1 and S2 the end marginal portions of the pocket sheet 29 may be firmly adhered to the adjacent portion 25 of the ribbon.

From the sealing rolls S1 and S2 the ribbon passes between a pair of rolls M1 and M2 where the roll M1 applies the adhesive spots 36 and 37 to the ribbon by means of a pair of suitably shaped and positioned adhesive applicators such as the applicator M3.

The final steps in the production of the finished mailing piece consists of passing the ribbon under a suitable heating unit H to dry the spots 36 and 37 of moisture-sensitive adhesive following which the ribbon passes between cutting rollers C1 and C2 of which the roller C1 is provided with a longitudinally extending knife edge C3. The cutting rollers C1 and C2 are constructed to cut the ribbon transversely into individual mailing pieces 20 each of which has an advertising area 21 and a return envelope area 22.

Ordinarily the folding of the individual mailing pieces 20 is not a part of the manufacturing operation, although if desired the company which manufactures the mailing pieces may also fold and seal them ready for addressing by the customer.

In the form of the invention shown in Figs. 9 to 13, the mailing piece has only a single sheet which is in the form of a return envelope body sheet indicated generally at 122. This body sheet is similar in construction to the body sheet area 22 of the two-sheet mailing piece 20. Thus, it is divided along lines 123 and 124 into a first marginal portion 125, a second marginal portion 126 and a central portion 127 each of which occupies ⅓ of the length of the sheet. A pocket sheet 129 is integrally connected with the lower marginal portion 125 along a fold line 130 and is turned back along said fold line 130 so as to lie in superposed relationship with the portion 125 to which it has its end portions 131 and 132 connected by means of lines of adhesive 133 and 134. Thus, the marginal portion 125 of the body sheet forms the rear wall and the pocket sheet 129 the front wall of an envelope pocket 135.

As seen in Fig. 9, the rear surface of the marginal portion 125 provides a return address space while the second marginal portion 126 provides an initial mailing address space. Adjacent the fold 130 is a small area 136 of moisture-sensitive adhesive, while adjacent the opposite margin, on the inner face of the marginal portion 126, is a similar area of moisture-sensitive adhesive 137.

As seen in Figs. 11 and 12, the mailing piece is used for initial mailing to a prospect and for return mailing to the original sender in the same manner as is the two-sheet mailing piece 20. Thus, for initial mailing the sheet is folded along the line 123 to place the pocket sheet 129 in facing relationship with the central portion 127, and thereafter a fold is made along the line 124 to close the second marginal portion 126 over the first marginal portion 125 and the mailing piece is sealed by moistening the area of moisture-sensitive adhesive 137 and sealing it to the adjacent part of the first marginal portion 125. For return mailing from the original addressee to the sender the mailing piece is folded as seen in Fig. 12. Thus, the first fold is made along the line 124 to place the second marginal portion 126 in facing relationship to the central portion 127, and the second fold is made along the line 123 so as to close the mailing piece with the pocket sheet 129 against the second marginal portion 126 and the first marginal portion 125 exposed with the return address thereon. The mailing piece is sealed by moistening the area of moisture-sensitive adhesive 136 and adhering it to the adjacent part of the marginal portion 126.

It is clear from the foregoing description that the single sheet form of mailing piece may also be manufactured in a continuous operation from a continuously advancing ribbon R of paper. The ribbon R is first passed through a rotary perfecting press P which prints the desired material on both sides of the ribbon. The ribbon then passes between a pair of adhesive applying rollers A1 and A2 which are identical with the adhesive applying rollers shown diagrammatically in Fig. 7 except that the roller A1 has adhesive applying elements A5 and A6 which are substantially wider than the first type of elements A3 and A4 so as to apply transversely extending double width lines of adhesive of which the forward half ultimately will become an adhesive strip 133 of one mailing piece while the rear half will become the adhesive strip 134 of the next mailing piece.

The ribbon R moves forward so that one marginal portion which is ¼ the width of the ribbon is engaged by a folder F which continuously folds said marginal portion over upon the next adjacent quarter of the ribbon. Thus, it is apparent that said marginal portion forms the pocket sheets 129 of the series of mailing pieces 122 which are produced in the operation, while the next adjacent quarter of the ribbon forms the first marginal portion 125 of the mailing piece. From the folder F the ribbon passes between sealing rollers S1 and S2 which firmly adhere the folded marginal portion of the strips of adhesive 133—134 to form a series of pockets 135.

The ribbon then moves forward between a pair of moisture-sensitive adhesive applying rollers M1 and M2, the roller M1 being provided with marginal adhesive applying elements M3 which apply the spots of adhesive 136 and 137 to the ribbon after which the ribbon passes under a heating unit H to dry the spots of adhesive 136 and 137.

The ribbon next moves between a pair of cutting rolls C1 and C2, the roll C1 being provided with a pair of cutters C4 and C5 which cut the ribbon into a series of one-page mailing pieces 122 each of which has an envelope pocket. Thus, the cutters C4 and C5 cut along lines 128 which are seen in Fig. 14 to pass through the median line of each strip of adhesive so that each mailing piece has a strip of adhesive at each end of the envelope pocket.

The foregoing detailed description is given for clearness of understanding only and no unnecessary limitations are to be understood therefrom, as some modifications will be obvious to those skilled in the art.

We claim:

1. A return envelope mailing piece comprising: a rectangular body sheet which is divided by fold lines into three equal rectangular portions including two marginal portions and a center portion, each said body portion being uninterrupted between its boundaries, the outer face of a first marginal portion providing a mailing address space which is utilized for an initial mailing and the outer face of the second marginal portion providing a return address space which is utilized for a return mailing; a pocket sheet which overlies the inner face of one of said marginal portions, said pocket sheet having three margins contiguous with those of said one of said marginal portions and being connected to the body sheet along said three margins to define with said one of said marginal portions an inwardly open envelope pocket; a first area of moisture-sensitive adhesive along the lateral outer margin of the pocket sheet; and a second area of moisture-sensitive adhesive along the lateral outer margin of said second marginal portion on the inner face thereof, whereby said mailing piece may be selectively arranged for initial mailing or return mailing with all three portions of the body sheet intact by folding it with the marginal portion bearing the utilized address space for the desired mailing concealing the other address space, the utilized address being outermost in each mailing.

2. The device of claim 1 in which the pocket sheet has its lateral margin integrally connected with the body sheet and its longitudinal margins are connected to the body sheet by means of adhesive.

3. A return envelope mailing piece comprising: a rectangular body sheet which is divided by fold lines into three laterally extending equal rectangular portions including two marginal portions and a center portion, each said body portion being uninterrupted between its boundaries, said body sheet having an advertising area and a return envelope area which are laterally adjacent and separated by a fold line, the outer face of a first marginal portion of the return envelope area providing a mailing address space which is utilized for an initial mailing and the outer face of the second marginal portion of said area providing a return address space which is utilized for a return mailing; a pocket sheet which overlies the inner face of one of said marginal portions of the return envelope area, said pocket sheet having three margins contiguous with those of said one of said marginal portions and being connected to the body sheet along said three margins to define with said one of said marginal portions an inwardly open envelope pocket; a first small area of moisture-sensitive adhesive along the lateral outer margin of the pocket sheet, and a second small area of moisture-sensitive adhesive along the lateral outer margin of said second marginal portion of the return envelope area on the inner face thereof, said advertising area having jogs in its lateral margins so that the advertising area may be superposed upon the return envelope area and leave both said moisture-sensitive adhesive areas exposed through said jogs, whereby said mailing piece may be selectively arranged for initial mailing or return mailing with all three portions of the return envelope area intact by folding it with the marginal portion bearing the utilized address space for the desired mailing concealing the other address space, the utilized address being outermost in each mailing.

4. The device of claim 3 in which the pocket sheet has its lateral margin integrally connected with the return envelope area of the body sheet and its longitudinal margins are connected to the body sheet by means of adhesive.

5. A return envelope mailing piece comprising: a rectangular body sheet which is divided by fold lines into three equal rectangular portions including two marginal portions and a center portion, each said body portion being uninterrupted between its boundaries, the outer face of a first marginal portion providing a mailing address space which is utilized for an initial mailing and the outer face of the second marginal portion providing a return address space which is utilized for a return mailing; a pocket sheet which overlies the inner face of one of said marginal portions, said pocket sheet having three margins contiguous with those of said one of said marginal portions and being connected to the body sheet along said three margins to define with said one of said marginal portions an inwardly open envelope pocket; and an area of adhesive along the lateral outer margin of the inner face of the return address space, whereby said mailing piece may be selectively arranged for initial mailing or return mailing with all three portions of the body sheet intact by folding it with the marginal portion bearing the utilized address space for the desired mailing concealing the other address space, the utilized address being outermost in each mailing.

6. A return envelope mailing piece comprising: a body sheet which is divided by fold lines into three laterally extending equal rectangular portions including two marginal portions and a center portion, each said body portion being uninterrupted between its boundaries, and said body sheet having an advertising area and a return envelope area which are laterally adjacent and separated by a fold line, the outer face of a first marginal portion of the return envelope area providing a mailing address space which is utilized for an initial mailing and the outer face of the second marginal portion of said area providing a return address space which is utilized for a return mailing; a pocket sheet which overlies the inner face of one of said marginal portions of the return envelope area, said pocket sheet having three margins contiguous with those of said one of said marginal portions and being connected to the body sheet along three margins to define with said one of said marginal portions an inwardly open envelope pocket; a first area of adhesive along the lateral outer margin of the pocket sheet, and a second area of adhesive along the lateral outer margin of said second marginal portion of the return envelope area on the inner face thereof, said advertising area having its lateral margins recessed in areas coinciding with said areas of adhesive so that the advertising area may be superposed upon the return envelope area and leave both said adhesive areas exposed, whereby said mailing piece may be selectively arranged for initial mailing or return mailing with all three portions of the return envelope area intact by folding it with the marginal portion bearing the utilized address space for the desired mailing concealing the other address space, the utilized address being outermost in each mailing.

7. A return envelope mailing piece comprising: a body sheet which is divided by fold lines into three laterally extending equal rectangular portions including two marginal portions and a center portion, each said body portion being uninterrupted between its boundaries, and said body sheet having an advertising area and a return envelope area which are laterally adjacent and separated by a fold line, the outer face of a first marginal portion of the return envelope area providing a mailing address space which is utilized for an initial mailing and the outer face of the second marginal portion of said area providing a return address space which is utilized for a return mailing; a pocket sheet which overlies the inner face of one of said marginal portions of the return envelope area, said pocket sheet having three margins contiguous with those of said one of said marginal portions and being connected to the body sheet along said three margins to define with said one of said marginal portions an inwardly open envelope pocket; and an area of adhesive along the lateral outer margin of the inner face of the return address space, the advertising area having its lateral margin recessed in an area coinciding with said area of adhesive so that the advertising area may be superposed upon the return envelope area and leave the area of adhesive exposed, whereby said mailing piece may be selectively arranged for initial mailing or return mailing with all three portions of the body sheet intact by folding it with the marginal portion bearing the utilized address space for the desired mailing concealing the other address space, the utilized address being outermost in each mailing.

References Cited in the file of this patent

UNITED STATES PATENTS

| | | |
|---|---|---|
| 1,185,993 | Fujioka | June 6, 1916 |
| 1,479,280 | Brown | Jan. 1, 1924 |
| 1,944,794 | Klinger | Jan. 23, 1934 |
| 1,985,194 | Smith | Dec. 18, 1934 |
| 2,340,700 | Sawdon | Feb. 1, 1944 |
| 2,402,821 | Kosteling | June 25, 1946 |
| 2,681,175 | David | June 15, 1954 |
| 2,759,658 | Sawdon | Aug. 21, 1956 |
| 2,773,638 | Krohn | Dec. 11, 1956 |